F. Egge,

Padlock.

No. 3,880. Reissued Mar. 15. 1870.

Witnesses:-

Joe S. Keyton

Battis DeLong.

Inventor:-

F. Egge by his Atty

Wm. D. Baldwin

United States Patent Office.

F. W. SMITH, JR., OF BRIDGEPORT, CONNECTICUT, GEORGE W. BASSETT, OF NEW YORK, N. Y., AND S. R. WILMOT, OF BRIDGEPORT, CONNECTICUT, ASSIGNEES OF FREDERICK EGGE.

*Letters Patent No.* 86,377, *dated February* 2, 1869; *reissue No.* 3,880, *dated March* 15, 1870.

IMPROVEMENT IN PADLOCKS.

The Schedule referred to in these Letters Patent and making part of the same.

*To all whom it may concern:*

Be it known that I, FREDERICK EGGE, of Crempe, in Holstein, temporarily residing in Bridgeport, in the county of Fairfield, and State of Connecticut, have invented a new and useful Improvement in Padlocks; of which the following is a full, clear, and exact description.

The lock hereinafter described is designed specially for what is termed a "mail-bag lock," but is equally capable of effective service as an ordinary padlock.

The improvement herein claimed consists in combining a spring bolt, oscillating upon a pivot located centrally within the case, a key which unlocks the bolt by striking it below its pivot and turning said lower portion in a direction opposite to that of the movement of the bolt, and one or more spring tumblers to add to the security of the lock.

The improvement further consists in combining a circular case, having rounded edges and a notch or recess therein for the insertion of a staple, a spring bolt, curved in the arc of a circle and oscillating across the notch and around a pivot located centrally within the case, spring tumblers oscillating eccentrically to the bolt, and a key which acts on the bolt-lever at a point on the opposite side of the pivot from the bolt.

The improvement further consists in combining the oscillating spring bolt with the rounded edges of the case, in such manner that the curved edges of the case act as a guide and also as a support for the bolt against lateral strains.

In the accompanying drawings—

Figure 1:
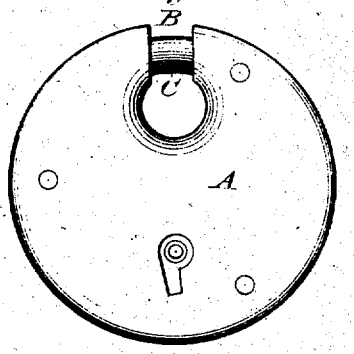

Figure 1 is a view in elevation of my improved lock as seen from the front when locked.

Figure 2:
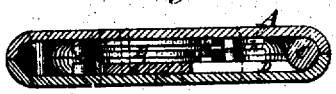
Figure 3:
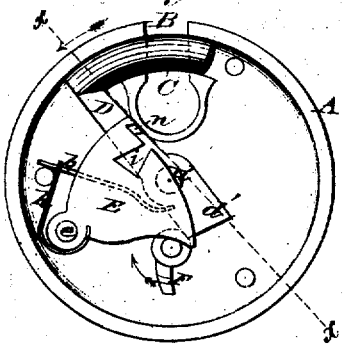

Figure 2, a transverse section through the same at the line *x x* of fig. 3.

Figure 3, a view similar to fig. 1 with the front plate removed.

Figure 4:
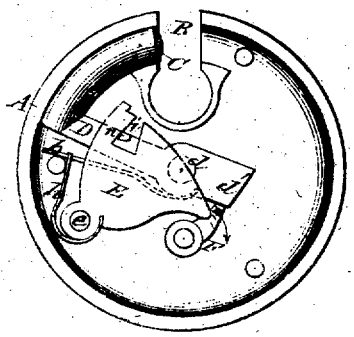

Figure 4, a similar view, showing the position of the mechanism when unlocked.

The case A is by preference made in the ordinary form of a watch-case; that is, with a circular outline, sides parallel or only slightly convex or concave, and with its edges rounded, as in fig. 2.

This peculiar form possesses several advantages, as by it the case may be stamped up in two symmetrical pieces; it presents no sharp edges or corners to batter against tables or other articles it may strike; it possesses great strength; the parts may readily be united by bolts, rivets, or other means, and, when so united, the curved rim may be used as a guide for the bolt, as shown in the drawings.

Locks have heretofore been made with circular perimeters and rectangular sides, or, in other words, in the form of sections of cylinders; but this form obviously does not possess the advantages of that shown by me.

A notch or recess, B, for the reception of the staple, is made in the edge of the lock. The abutments of this notch are brought as close together as is consistent with the passage of the staple, in order to afford strong support to the bolt.

The bolt C is of a round form in its cross-section, attached to one end of a lever, D, vibrating on a pivot, *d*, in the center of the case, and is curved in the arc of a circle, of which said pivot forms the center. The bolt is thus caused to traverse concentrically within the case, being supported and guided by its curved edge, as above described.

The lever D projects beyond its pivot, and its projection *d'* is acted upon by the key F, as hereinafter described. The key is of the ordinary form used in tumbler locks.

A spring, *b*, throws the bolt forward when released by the key, so that the bolt always remains locked unless retracted by the key. This renders it impossible to secure the lock to the mail-bag without locking it.

At a convenient point within the case I arrange one or more tumblers E, oscillating on a pivot, *e*, eccentric to that of the bolt, and provided with suitable notches *i*, to be acted upon by a stud, *n*, on the bolt-lever, in the manner common to locks of this class.

Springs *h* are arranged to return the tumblers to their normal position when released by the key.

The operation of the lock is as follows:

The parts always occupy the position shown in fig. 3 when undisturbed, that is, with the bolt shot across the notch.

The key is inserted and turned to the right, (as shown by the arrows,) bearing upon the tumblers E, and lifting them until the stud *n* enters the notches *i* in the tumblers; the key also simultaneously bears against the projection *d'* of the bolt-lever and retracts the bolt, when the staple may either be inserted in the notch B or removed therefrom, as required.

As soon as the key escapes from the bolt-lever, the latter is shot across the notch by its spring *b*, and the tumblers are simultaneously retracted by their springs.

It will be noticed that, in my improved lock, the staple on the door or mail-bag enters the notch in the case, and is locked by shooting the bolt across this notch. The bolt also moves inside the case. By this means the ordinary hasp hinged to the outside of the case is dispensed with, the mechanism of the lock simplified, and the cost of manufacture diminished. I do not, however, broadly claim this kind of lock.

I do not claim broadly the combination of an oscillating bolt with oscillating tumblers pivoted eccentrically thereto.

I claim as my invention—

The herein-described padlock, having the bolt C attached to one arm of the lever D, and provided with the spring *b*, the said lever D being pivoted, so that the key will strike the other arm of the lever and move the bolt in the opposite direction to the turning of the key, the said spring operating to return the bolt into its locked position, combined with one or more tumblers E, the whole constructed and arranged so as to operate as herein set forth.

Also, the combination of the circular case having rounded edges and a notch for the staple, the curved oscillating spring bolt, traversing in the edge of the case and across the notch, the oscillating bolt-lever, the oscillating spring tumblers, and the key, all these parts being constructed to operate substantially as hereinbefore set forth.

Also, the combination of the round oscillating bolt and its spring with the circular case having rounded edges, in such manner that the curved edge of the case serves as a guide and a support for the bolt, all these parts being constructed to operate as set forth.

In testimony whereof I have hereunto subscribed my name.

FREDERICK EGGE.

Witnesses:

CURTIS THOMPSON,

J. A. BOUGHTON.